United States Patent [19]

Hann

[11] Patent Number: 5,152,861
[45] Date of Patent: Oct. 6, 1992

[54] SIMULTANEOUS MOULDING AND TRANSFER PRINTING

[75] Inventor: George R. Hann, Queensland, Australia

[73] Assignees: Valentine Tatzenko; Sandor L. Kranicz; Elizabeth A. Kranicz, all of Queenland, Australia

[21] Appl. No.: 427,836
[22] PCT Filed: Feb. 16, 1988
[86] PCT No.: PCT/AU88/00042
  § 371 Date: Oct. 16, 1989
  § 102(e) Date: Oct. 16, 1989
[87] PCT Pub. No.: WO89/07530
  PCT Pub. Date: Aug. 24, 1989
[51] Int. Cl.$^5$ .................. B29C 45/16; B29C 59/06
[52] U.S. Cl. ........................ 156/230; 156/247; 264/511; 264/132; 264/259; 264/260; 264/316
[58] Field of Search ............... 264/259, 260, 511, 132, 264/316; 156/230, 247

[56] References Cited

U.S. PATENT DOCUMENTS

| | | |
|---|---|---|
| 3,309,254 | 3/1967 | Rowe . |
| 3,330,712 | 7/1967 | Rowe . |
| 4,314,814 | 2/1982 | Deroode . |
| 4,639,341 | 1/1987 | Hanamoto ..................... 264/511 |

FOREIGN PATENT DOCUMENTS

| | | |
|---|---|---|
| 7678187 | 3/1988 | Australia . |
| 5739940 | 3/1982 | Japan . |
| 6327222 | 3/1982 | Japan . |
| 1324796 | 7/1973 | United Kingdom . |
| 1496891 | 1/1978 | United Kingdom . |

OTHER PUBLICATIONS

Patents Abstracts of Japan, M-29, p. 141, JP, A, 55-81191 (Toppan Insatsu K.K.) Jun. 18, 1980, (18.06.80).
Patents Abstracts of Japan, M-137, p. 90 JP,A, 57,-39940 (Nippon Shiyashin Insatsu K.K.) Mar. 5, 1982 (05.03.82).
Derwent Abstract Accession No. 86-342413/52, Class P75 P78, JP,A, 61-255889 (Dainippon Printing K.K.) Nov. 13, 1986 (13.11.86).
Derwent Abstract Accession No. 84-267157/43, Class P74, JP,A, 60-131213 (Japan Steel Works (Nish-)) Jul. 12, 1985 (12.07.85).
Derwent Abstract Accession No. 85-207102/34, Class P74, JP,A, 60-131213 (Japan Steel Works (Nish-)) Jul. 12, 1985 (12.07.85).

Primary Examiner—Jan H. Silbaugh
Assistant Examiner—Angela Ortiz
Attorney, Agent, or Firm—Renner, Otto, Boisselle & Sklar

[57] ABSTRACT

A printing method for moulded plastics articles comprises printing of selected indicia onto an elastomeric film (2), locating the printed film (2) in a mould cavity (3) with the printed surface facing inwardly and the evacuating the air space between the film (2) and the mould surface (8). With the printed film (2) located firmly against the mould cavity (3), the film (2) is manipulated to bring the printed indicia into register with surface features of the mould (8). Plastics material is injected into the mould cavity (4) and during solidification, the printed indicia is transferred from the film (2) to the surface of the moulded article with the printed indicia in accurate register with surface features of the moulded article.

18 Claims, 1 Drawing Sheet

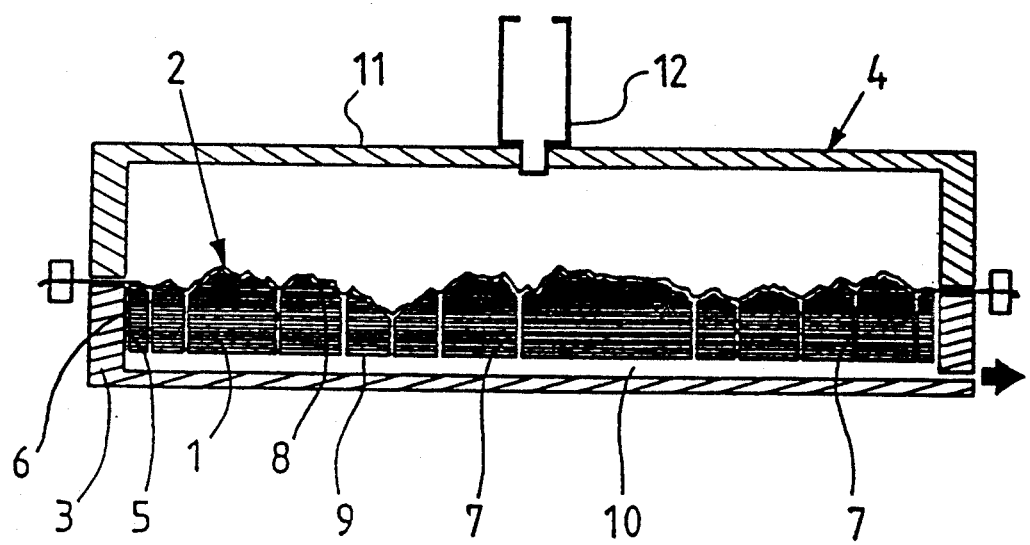

SIMULTANEOUS MOULDING AND TRANSFER PRINTING

This invention is concerned with a method of printing articles and printed articles produced by that method.

The invention is particularly although not exclusively concerned with a method of printing articles by transfer of a printing medium from a substrate onto an article to be printed, the article having a planar or contoured surface.

BACKGROUND OF THE INVENTION

Although at present complex multi-coloured prints may be applied quite readily to planar surfaces by such printing techniques as offset, lithographic, flexographic, screen printing and the like, there is no satisfactory method for printing of contoured articles wherein a high degree of accuracy is required.

Three dimensional topographical maps for use by government mapping departments, forestry departments, mining departments and military forces and the like require precisely located markings of contour lines, roads, railway tracks, rivers, streams, vegetation areas and the like in up to five or even more different colours. While the markings on such three dimensional contour maps may be produced quite satisfactorily by hand such manual marking is far too slow and expensive for high volume production.

It has been proposed to produce large quantities of three dimensional topographical contour maps by screen printing the required indicia or markings on a planar sheet of thermoplastics material and then vacuum forming the printed sheet in a contoured mould. This process is not satisfactory in that the varying degrees of stretching that occur in the heated sheet as it is drawn into cavities of varying depth cause distortion in the print with resultant misalignment of the indicia or markings with their intended position on the surface of the contoured map. In an endeavour to alleviate this problem computer calculated distortions are incorporated into the planar print with a view to compensating for the distortions which might otherwise occur during the vacuum forming process.

Although the pre-distortion of the printed indicia does to some extent improve the finished product, printed contour maps of this kind are inherently inaccurate. Differing levels of resident stress in the thermoplastic sheets combined with minor differences in the properties of the batches of thermoplastics material cannot be calculated and thus compensated for. In addition slight differences in moulding conditions such as pre-heat temperature of the sheet plastics material, mould temperatures and the like effectively prevent consistent manufacture of precisely marked three dimensional contour maps by this process.

SUMMARY OF THE INVENTION

It is an aim of the present invention to provide a reproducible method for precise printing of contoured articles.

It is a further aim of the invention to overcome or alleviate the difficulties associated with prior art methods for printing three dimensional contour maps and so provide accurately printed three dimensional contour maps produced by the method according to the invention.

It is yet a further aim of the invention to provide a novel method of transfer printing on moulded articles.

According to one aspect of the invention there is provided a method applying indicia to an article comprising the steps of:

applying to a sheet-like substrate a transferable print medium in the form of indicia to be transferred to the surface of an article;

supporting the sheet-like material against a support surface; and, bringing into contact with said transferable print medium the surface of an article to be printed under conditions whereby said indicia is transferred to the surface of said article.

Suitably said sheet-like substrate comprises a flexible membrane, preferably a resiliently flexible membrane.

Most preferably said flexible membrane is comprised of an elastomeric polymer.

The print medium may suitably comprise a paint, ink or like medium which is adapted for application onto said substrate by any suitable printing process.

Preferably said print medium is adapted for preferential adhesion to the surface on an article to be printed.

The support surface may comprise any suitable surface, preferably an exposed surface of a female mould, or it may comprise the surface of an article to be printed. Most preferably said exposed surface is contoured.

If required lubricating means may be provided between said support surface and said sheet-like substrate to facilitate positioning of said sheet-like substrate in a predetermined position relative to said support surface. Preferably said sheet-like substrate is retained against said support surface under the influence of a reduced atmospheric pressure. Alternatively the membrane may be retained by a positive air pressure above the membrane.

In order that the invention may be more clearly understood a preferred embodiment of the invention will now be described with reference to the accompanying drawing.

DETAILED DESCRIPTION OF THE DRAWINGS

The sole FIGURE of the drawing is a cross-sectional view through a mould useful in practicing the method of the invention.

DETAILED DESCRIPTION OF THE INVENTION

In the initial stages of manufacture of a three dimensional topographical contour map it is first necessary to produce a model to the required scale. Such a model is constructed by skilled cartographers according to conventional techniques and may for example be constructed on a rigid base using a curable or hardenable modelling composition or a paraffin wax.

A female mould is then prepared from the model—again by conventional techniques and, if required, the mould may include perforations or venting ports communicating with the support surface to enable evacuation of air entrapped between the sheet-like substrate and the support surface.

Convenient techniques may include spark etching techniques to produce a metal mould or casting a mould with a hardenable compound such as aluminium powder filled epoxy or polyester resins.

A print substrate in the form of a thin rubber latex membrane was then prepared by casting onto a planar surface and allowing the membrane film to cure. The membrane may however be made by any suitable process.

In the present case the latex membrane measured 1 metre in area and was 0.05 mm in thickness.

The latex membrane print substrate was then placed on the platen of a silk screen printing bed and smoothed out to remove wrinkles and air bubbles. Indicia in various colours representing contour lines, roads, railway tracks, rivers, townships were then sequentially printed onto the print substrate in such a manner as to cause the required visual features of the print to be in contact with the membrane.

For example on a first print run a black printing ink is employed with an appropriate screen to apply to the substrate indicia markings corresponding to roads, tracks, railway tracks and the like. The printed indicia is then allowed to cure at least partially to achieve a "touch-dry" surface.

The preferred printing ink for this embodiment of the invention is an "In-mould lacquer" of the type used in polyurethane reaction injection moulding (RIM) techniques. This lacquer is designed to be applied to the inner surface(s) of a mould cavity prior to injection of the polyurethane components. This material does not require the use of an external mould release agent since a mould release agent incorporated in the lacquer provides sufficient release properties from the mould surface. Usually such a lacquer is applied to a heated mould (150–160 degrees F.) and allowed to cure at least partially under the influence of heat from the mould. When the injected polyurethane components react inside the mould, the lacquer chemically bonds to the moulded article and forms a decorative surface finish to the article. This technique is utilized to apply a single colour all over finish to a polyurethane article produced by a RIM process.

After the first application of screen printed indicia in say black ink (lacquer) to represent details such as roads, buildings, printed names etc., other coloured indicia are subsequently applied e.g. blue rivers and waterways and brown contour lines.

The final print pass represents the major background colour e.g. green for vegetation and the finished print has the appearance of a conventional two dimensional map. Alternatively the order of printing may be in the reverse order however, it is important in this aspect of the invention that the print has substantially the same visual appearance both at its exposed surface and at the interface between the print and the membrane substrate to enable subsequent positioning on a surface to be printed.

When the print is complete the membrane substrate is removed from the print platen and positioned over the previously prepared mould. To facilitate handling of the membrane substrate it may be supported about its periphery in a frame.

In the drawings, the surface of the mould 1 is lightly coated with a lubricating composition such as glycerine or the like and the printed substrate 2 is then brought into contact with the mould surface. The mould 1 is located in the lower half 3 of a RIM mould 4 and is sealed about its peripheral edge 5 against the inner wall 6 of the lower mould half 3. The mould 1 includes a plurality of fine passageways 7 extending between the upper and lower surfaces 8 and 9 respectively of the mould 1. The passageways 7 communicate with a plenum 10 which in turn is connected to a vacuum pump or the like to evacuate the air space between the membrane 2 and the upper surface 8 of the mould 1. To ensure a complete evacuation of air the passageways 7 are located at the lowermost part of the recessed regions or valleys between raised projections on the contoured upper surface 8. If required the mould may be comprises of a porous or foraminous material to facilitate evacuation of the air between the membrane and the upper surface 8.

The air is then evacuated and as the membrane comes into contact with the surface of the mould 1 it stretches in some regions to accommodate the contours of the mould.

The membrane is then manipulated if required by pushing with fingertips or a similar soft instrument to align the printed indicia with respective topographical features in the mould cavity. To assist in initial location of the membrane 2 the membrane and/or the upper surface 8 of the mould may include markings or alignment indicia which are brought into registration prior to evacuation of the air. Due to the resilience of the membrane substrate the membrane may be stretched or contracted as required to accurately position the indicia relative to corresponding topographical features on the mould surface.

When the printed membrane is accurately positioned, the mould is then closed by upper mould half 11 and reactive polyurethane components are injected into the mould via injection port 12.

The components are allowed to react to fill the mould cavity and after curing the moulded article is removed. The membrane print substrate may then be peeled from the surface of the moulded article leaving the print chemically bonded to the contoured surface of the article.

The resultant article is a three dimensional topographical contour map having accurately marked thereon indicia representing roads, contour lines, rivers, vegetation, etc.

Apart from the obvious advantages of accurate marking of topographical features, three dimensional topographical contour maps made in accordance with the invention are far more durable than prior art three dimensional maps of this kind. Prior art maps were generally made from vacuum formed high impact polystyrene sheet which is relatively brittle and thus easily broken. Possibly the major disadvantage of such prior art maps is that the printed surface is not resistant to scratching and thus after a period of use in the field the printed indicia became difficult to read thus necessitating replacement of the maps. Other advantages possible with the present invention and absent from prior art maps of this kind are the ability to form composite maps by abutting the upstanding edges of the moulded articles and due to their resilient nature, marking pins or the like may be readily inserted into the surface and relocated as required without significant damage to the printed surface. Maps according to the invention may be cleaned by simply washing with water and soap or detergent and they may be exposed to weathering over extended periods without significant deterioration.

Printed articles made in accordance with the above embodiment are highly durable due to the inherent flexibility and abrasion resistance of polyurethane compounds.

The articles can be made according to the RIM process with a wide variety of physical properties as required from rigid polyurethane foams through to flexible foams.

By utilizing a transparent membrane substrate the membrane may be left in contact with the printed surface to provide a protective covering if required.

Although the preferred embodiment has been described with reference to a resilient rubber latex membrane it is believed that the inherent elastomeric qualities of polyurethane may permit the manufacture of a polyurethane print substrate membrane which could be permanently bonded to the finished article.

It will be apparent that the process according to the invention may be applicable to a wide variety of articles moulded by the RIM process. For example the process may be utilized for in-mould printing of contoured articles such as decorative plaques, mannikins for display of clothing, integrally moulded furniture items, self-skinning vehicle upholstery covers or seating, display signs, toys and the like. Other applications of the invention may include in-mould application of labels or other indicia to a part only of the surface of the article.

The surface of the membrane substrate may be textured by say a casting process to impart a textured finish to the moulded article. Such textures may be evenly appllied to all surfaces of the finished article e.g. a reptile skin texture, or applied selectively to certain regions i.e. a trade mark or manufacturer's label. It will be clear to a skilled addressee that the ability to apply textured finishes to RIM moulded articles will substantially decrease the cost of mould manufacture.

In a modification of the invention the process may be employed to achieve "in-mould" printing of say labels on injection moulded or blow moulded articles. In this modification a strip of resilient printed substrate is positioned between mould halves. As the mould halves are clamped shut, the resilient substrate is clamped firmly between the abutting mould faces and when material is injected or blown into the mould cavity the substrate is forced against the surface of the mould whereupon the printed indicia is transferred to the moulded article. If required the membrane may be located on the inner surface of the mould by evacuating perforated passageways in the mould wall. The membrane would act as a barrier to material entering the air evacuation passageways. Obviously the nature of the elastomeric substrate and the chemical composition of the printing medium are chosen to suit the operating conditions and the chemical nature of the material being moulded to effect a suitable transfer of the printed indicia.

In yet another modification of the invention a printed transparent substrate may be applied to an outer surface of an article with a bonding medium therebetween. Initially the bonding medium may act as a lubricant to enable accurate positioning of the printed indicia relative to the article to which it is being applied. When the printed indicia is accurately positioned the bonding medium may be cured by heat, electromagnetic radiation or the like to effect transfer of the print.

In yet a further modification of the invention the membrane, bearing a transferable indicia, may be applied to the surface of a pre-moulded article. The membrane may be retained in a desired position against the surface of the article by an externally applied positive air pressure or by internally evacuating the mouled article. Print transfer may then occur by any suitable process such as by heating or the like whereby the transferable indicia supported on the membrane chemically bonds to the surface of the moulded article.

It will be readily apparent to a skilled addressee that many modifications and variations will be possible with the invention without departing from the spirit and scope thereof.

What is claimed is:

1. A method of applying indicia to an article having a contoured surface, said method comprising the steps of:
    applying to a contoured support surface a resiliently flexible membrane, said resiliently flexible membrane including a transferrable print medium in the form of indicia to be transferred to the contoured surface of said article;
    evacuating air from between said resiliently flexible membrane and said contoured support surface to draw said resiliently flexible membrane into close conforming contact with said contoured support surface;
    then manually manipulating individual portions of said resiliently flexible membrane relative to one another to register features of said indicia with corresponding features on said contoured support surface; and
    then contacting said transferrable print medium with the contoured surface of said article under conditions effecting transfer of said indicia to the contoured surface of said article.

2. A method as set forth in claim 1, wherein said contoured support surface is gas permeable, and said supporting step includes applying reduced gas pressure to said gas permeable contoured support surface to draw said resiliently flexible membrane into close conforming contact with said contoured support surface.

3. A method as set forth in claim 2, wherein said transferrable print medium is activated by heat.

4. A method as set forth in claim 1, wherein said contoured support surface comprises a contoured surface of a mould for said article and said print medium is located on an outwardly exposed surface of said resiliently flexible membrane not in contact with the surface of said mould.

5. A method as set forth in claim 4, wherein said mould comprises a perforated or foraminous female mould including said contoured support surface.

6. A method as set forth in claim 4, wherein said transferable print medium is adapted for preferential adhesion to the contoured surface of said article.

7. A method as set forth in claim 1, wherein said resiliently flexible membrane comprises an elastomeric polymer.

8. A method as set forth in claim 7, wherein said elastomeric polymer comprises a cured rubber latex.

9. A method as set forth in claim 1, as applied to produce a three dimensional contour map.

10. A method of applying indicia to an article having a contoured surface, said method comprising the steps of:
    applying to the contoured surface of said article a resiliently flexible membrane, said resiliently flexible membrane including a transferrable print medium in the form of indicia to be transferred to the contoured surface of said article;
    evacuating air from between said resiliently flexible membrane and said contoured surface to draw resiliently flexible membrane into close conforming contact with said contoured surface;
    then manually manipulating individual portions of said resiliently flexible membrane relative to one another to register features of said indicia with corresponding features on said contoured surface; and then subjecting said print medium, in registered contact with the contoured surface of said article, to conditions effecting transfer of said indicia to the contoured surface of said article.

11. A method as set forth in claim 10, wherein said article is composed of foraminous material or includes perforations.

12. A method as set forth in claim 11, wherein said supporting step includes applying reduced gas pressure to said article to draw said resiliently flexible membrane into close conforming contact with said contoured surface.

13. A method as set forth in claim 10, wherein said transferrable print medium is activated by heat.

14. A method as set forth in claim 10, wherein said transferrable print medium is adapted for preferential adhesion to said contoured surface of said article.

15. A method as set forth in claim 10, wherein said resiliently flexible membrane comprises an elastomeric polymer.

16. A method as set forth in claim 15, wherein said elastomeric polymer comprises a cured rubber latex.

17. A method as set forth in claim 10, as applied to produce a three dimensional contour map.

18. A method of applying indicia to an article having a contoured surface, said method comprising the steps of:

printing indicia onto an elastomeric film, which indicia may be transferred to the contoured surface of said article;

locating the printed film in an open mould cavity with the printed surface facing away from a contoured mould surface of the mould;

evacuating air from between the elastomeric film and the contoured mould surface of the mould to draw the elastomeric film into close conforming contact with the contoured mould surface of the mould;

manually manipulating individual portions of the elastomeric film relative to one another to register features of the indicia with corresponding features of the contoured surface of the mould;

closing the mold and then introducing moldable material into the mould cavity to form the article under conditions effecting transfer of the indicia from the elastomeric film to the contoured surface of the article with the printed indicia in accurate register with surface features of the article which are complimentary to the surface features of the contoured surface of the mould.

* * * * *